(12) United States Patent
Aldana Arjol et al.

(10) Patent No.: US 9,609,697 B2
(45) Date of Patent: Mar. 28, 2017

(54) COOKTOP AND METHOD FOR OPERATING A COOKTOP

(75) Inventors: Oscar Luis Aldana Arjol, Zaragoza (ES); Pablo Jesus Hernandez Blasco, Cuarte de Huerva (ES); Ignacio Millan Serrano, Zaragoza (ES); Fernando Monterde Aznar, Zaragoza (ES); Daniel Palacios Tomas, Zaragoza (ES)

(73) Assignee: BSH Hausgeräte GmbH, Munich (DE)

( * ) Notice: Subject to any disclaimer, the term of this patent is extended or adjusted under 35 U.S.C. 154(b) by 1356 days.

(21) Appl. No.: 13/063,781

(22) PCT Filed: Sep. 23, 2009

(86) PCT No.: PCT/EP2009/062307
§ 371 (c)(1),
(2), (4) Date: Mar. 14, 2011

(87) PCT Pub. No.: WO2010/037675
PCT Pub. Date: Apr. 8, 2010

(65) Prior Publication Data
US 2011/0163086 A1    Jul. 7, 2011

(30) Foreign Application Priority Data
Sep. 30, 2008  (DE) .......................... 10 2008 042 512

(51) Int. Cl.
*H05B 6/12*  (2006.01)
*H05B 6/06*  (2006.01)

(52) U.S. Cl.
CPC ........... *H05B 6/065* (2013.01); *H05B 6/1272* (2013.01); *H05B 2213/03* (2013.01); *Y02B 40/126* (2013.01)

(58) Field of Classification Search
CPC ............. H05B 6/06; H05B 6/062; H05B 6/12
USPC ........ 219/600, 608, 618, 650, 661, 662, 663, 219/660, 715, 667, 620, 622, 625, 626,
(Continued)

(56) References Cited

U.S. PATENT DOCUMENTS 5,491,423 A * 2/1996 Turetta ............................ 324/663
6,417,494 B1 * 7/2002 Westerberg et al. .......... 219/402
6,528,770 B1 * 3/2003 Akel et al. ..................... 219/624
(Continued)

FOREIGN PATENT DOCUMENTS

EP    1303168 A1    4/2003
EP    1951003 A1 *  7/2008    ............... H05B 6/06
(Continued)

OTHER PUBLICATIONS

National Search Report CN 2009801384665.

*Primary Examiner* — Michael Laflame, Jr.
(74) *Attorney, Agent, or Firm* — Michael E. Tschupp; Andre Pallapies

(57) ABSTRACT

A cooktop is provided that includes heating elements which are combined to a heating zone; a power supply to generate a heating current that operates the heating elements; a switch to open and close a power circuit that includes the power supply and one of the heating elements; and a controller that determines a characteristic variable of the heating current, actuates the switch as a function of a selected power level to operate the heating zone, and activates, in a first operating state, two of the heating elements, which are combined to form the heating zone, in different phases of a heating period.

23 Claims, 3 Drawing Sheets

(58) Field of Classification Search
USPC ........ 219/627, 664, 665; 307/112, 113, 125, 307/127, 138
See application file for complete search history.

(56) References Cited

U.S. PATENT DOCUMENTS

| | | |
|---|---|---|
| 6,870,138 B2 * | 3/2005 | Pastore ...................... 219/447.1 |
| 2001/0025848 A1 * | 10/2001 | Cornec et al. ................ 219/624 |
| 2005/0105313 A1 * | 5/2005 | Bocchiola ..................... 363/132 |
| 2007/0080158 A1 * | 4/2007 | Takimoto ..................... 219/627 |
| 2008/0087661 A1 * | 4/2008 | Haag et al. ................... 219/620 |
| 2008/0121633 A1 * | 5/2008 | Pinilla et al. ................. 219/494 |
| 2009/0173730 A1 | 7/2009 | Baier et al. |

FOREIGN PATENT DOCUMENTS

| | | | |
|---|---|---|---|
| EP | 1951003 A1 * | 7/2008 | |
| WO | 2005069688 A2 | 7/2005 | |

* cited by examiner

COOKTOP AND METHOD FOR OPERATING A COOKTOP

BACKGROUND OF THE INVENTION

The invention is based on a cooktop and a method for operating such a cooktop.

Cooktops with a number of heating elements combined to form a heating zone are known from the prior art. The heating elements can be disposed concentrically for example and be operated so that outer rings of the heating zone are only activated when the pot diameter of a pot placed on the heating zone exceeds a limit value. In other known cooktops many heating elements are disposed in a matrix or grid, for example a 4×4, 6×6 or 8×8 grid. A cooking utensil element placed on the cooktop is detected and a number of heating elements disposed beneath the base of the cooking utensil element are combined to form a freely configurable heating zone.

The heating elements combined to form a heating zone are each supplied with a heating current by a power supply unit. A power supply unit configured as an inverter is frequently assigned to each inductor, particularly when the heating elements are induction heating units or inductors, it being possible for the inductor to be operated independently of the other inductors by way of the power supply unit. A control unit comprises means or suitable driver units for determining a characteristic variable of the heating current, for example an amplitude, frequency, direct current voltage or phase. The control unit further comprises means or suitable interfaces or driver units for actuating the switching unit as a function of a selected power level. The power level can be selected by the user by way of a user interface.

In the field of induction cooktops in particular the problem may arise during the operation of a number of combined heating elements that the different induction heating elements have to be operated simultaneously at the same frequency to avoid intermodulation hum. In induction cooktops the heating power is generally determined by varying the frequency of the heating current, so that synchronized operation of the induction heating units at the same time renders independent determination of the heating powers of the two heating elements impossible. It is further known to operate a number of induction heating elements of an induction cooktop, which are assigned to different heating zones, at different frequencies and to ensure that the difference between the frequencies of the heating currents does not drop below a minimum value determined by the audibility threshold of the human ear, to avoid audible hum. Particularly sensitive people and children can still hear the hum in some circumstances and feel disturbed by it.

In the field of cooktops with radiant heating units it is further known to switch the heating elements on and off periodically to achieve a specified average heating power over a heating period. A ratio of the duration of the phases in which a heating element is switched on to the overall duration of the heating period then corresponds to the ratio of setpoint heating power to a maximum heating power.

The simultaneous switching on and off of a number of heating elements can lead to a problem with flicker, in other words a feedback from the cooktop to the household power network, both in induction cooktops and in cooktops with radiant heating units. The flicker can produce voltage peaks which briefly overload the household power network, even if the maximum power of the household power network is not yet fully utilized away from the voltage peaks.

BRIEF SUMMARY OF THE INVENTION

The object of the invention is in particular to configure the heating powers of the number of heating elements that are combined to form a heating zone so that they can be determined independently, without flicker and/or hum problems as a result.

The invention is based on a cooktop having a number of heating elements combined to form a heating zone, at least one power supply unit for generating a heating current for operating the heating elements, a switching unit for opening and closing a power circuit comprising the at least one power supply unit and at least one of the heating elements and a control unit with means for determining a characteristic variable of the heating current and means for actuating the switching unit as a function of a power level selected for operating the heating zone.

It is proposed that the control unit should be designed in such a manner that it activates at least two of the heating elements combined to form a heating zone in different phases of the heating period in at least a first operating state. Compared with the simultaneous switching on and off of the heating elements in the same phases of the heating period it is possible to reduce the extent of fluctuation of the power consumption of the cooktop, resulting in fewer flicker problems. It is also possible without further ado to operate the heating elements combined to form a heating zone at different frequencies without the possibility of interference hum. This allows the average heating powers of the individual heating elements over the heating period to be determined independently of one another, allowing reliable and precise control of the heating power in particular for low mean heating powers. The heating power can be averaged over the heating period not only by adjusting the characteristic variables of the heating current, for example by adjusting the frequency of the heating current, but also by adjusting the lengths of the different phases. The duration of the heating period can be around 1 to 20 seconds for induction cooktops and between 1 and 5 minutes for radiant cooktops.

Because of the natural limits of the heating frequency or those produced by the inverter and the problems with interference hum that are then particularly urgent, the advantages of the invention are particularly significant when the cooktop is an induction cooktop. The heating elements are then induction heating elements and the power supply unit is an inverter. The characteristic variable of the heating current may be the frequency of the heating current.

In one development of the invention it is proposed that the control unit be designed to determine at least one inductance and one power factor respectively of the at least two heating elements combined to form a heating zone and to determine the operating state as a function of the inductances and power factors of the two heating elements and as a function of the selected power level. This allows the operating state to be determined as a function of the situation and flexibly and the heating operation can advantageously be tailored to the magnetic properties of the cooking utensil element placed on the heating zone. The magnetic properties influence the inductance and power factor so that by measuring the inductance and power factor it is possible to draw conclusions about the type of cooking utensil element. In particular the operating state can be selected in such a manner as to allow homogeneous heating of the base of the cooking utensil element. Hot regions on the base of the cooking utensil element resulting from one of the heating elements having too high a heating power can be avoided.

Although in principle it is also possible to select temporally overlapping phases, the advantages in respect of flicker reduction can in particular be achieved if the different phases follow one another directly without overlap or are separated by a time interval.

Because of the high level of interference between such induction heating elements, the advantages of the invention are particularly significant when the heating elements combined to form a heating zone are disposed concentrically. The heating zone can then in particular comprise two or three concentric rings, which can be connected or not as a function of the size of the cooking utensil base.

In an alternative embodiment of the invention the heating elements are disposed in a two-dimensional grid. The cooktop is therefore what is known as a matrix cooktop. The control unit is designed to combine the heating elements to form flexibly definable heating zones. The operating state and the assignment of the different heating elements to different phases within the heating period can in particular be a function of a relative geometric position of the different heating elements. For example heating elements that are disposed radially inward in relation to a center point of the cooking utensil element may be activated in a different phase from heating elements disposed radially outward. Heating elements with a powerful magnetic interaction may be assigned to the same phase and be operated at the same frequency.

Very low mean heating powers can also be set precisely if the control unit is designed not to activate any of the heating elements of the heating zone in at least one further phase of the heating period. The further phase may be used as a safety interval between the phases in which the switching apparatus can be actuated and reduces the value of the heating power averaged over the heating period.

It is further proposed that the control unit be designed to operate all the heating elements combined to form the heating zone simultaneously in at least a second operating state. Even high heating powers in the region of the maximum nominal heating power of the heating zone can thus be achieved and the alternating operation of the heating elements can be limited to power levels with low heating powers.

The flexibility of operation and the tailoring to the cooking utensil element can be further enhanced if the control unit is designed to determine a variable, for example a diameter, of a cooking utensil element placed on the heating zone. The control unit can in particular define the length of the different phases as a function of the variable, in order to achieve homogeneous heating power over a base surface of the cooking utensil element.

A predefined spatial distribution of the heating power can also be achieved within the heating zone in a simple manner if the control unit is designed to define the length of the different phases in such a manner that the heating powers produced by the heating elements in the different phases have a predefined ratio to one another. Alternatively or additionally the frequencies can also be determined in such a manner that the predefined ratio of the heating powers generated in the different phases is achieved.

The control logic can be simplified by reducing the number of variables, if the at least two heating elements activated in different phases of a heating period are operated in at least one range of power levels at the same heating power. The relative heating powers can be determined by selecting phase length.

Alternatively flexibility due to a maximum number of variables can be enhanced if the at least two heating elements activated in different phases of a heating period are operated in at least one range of power levels at different heating powers.

A further aspect of the invention relates to a method for operating a cooktop having a number of heating elements combined to form a heating zone. The cooktop comprises a power supply unit for generating a heating current for operating the heating elements, a switching unit for opening and closing a power circuit comprising at least the one power supply unit and at least one of the heating elements. According to the inventive method a characteristic variable of the heating current is determined as a function of a power level selected to operate the heating zone and/or the switching unit is actuated as a function of the selected power level.

It is proposed that in at least one operating state at least two of the heating elements combined to form a heating zone are activated in different, in particular overlap-free, phases of a heating period. The inventive method for operating a cooktop allows the advantages described in relation to the inventive cooktop to be achieved in the same manner. The inventive method can be applied in particular to induction cooktops, the power supply unit of which is an inverter and the heating elements of which are induction heating elements.

Flexible tailoring of the operating state to the operating conditions that have in particular also been determined adaptively by the cooking utensil element placed on the cooktop can be achieved if the method also includes the determination of at least one inductance and one power factor respectively of the heating elements. The operating state may be determined as a function of the inductances and power factors of the heating elements thus determined and as a function of the selected power level.

BRIEF DESCRIPTION OF THE DRAWINGS

Further advantages will emerge from the description of the drawing which follows. The drawing shows exemplary embodiments of the invention. The drawing, description and claims contain numerous features in combination. The person skilled in the art will also expediently consider the features individually and combine them in further useful combinations.

In the drawings.

DETAILED DESCRIPTION OF EXEMPLARY EMBODIMENTS OF THE PRESENT INVENTION

Figure 1:
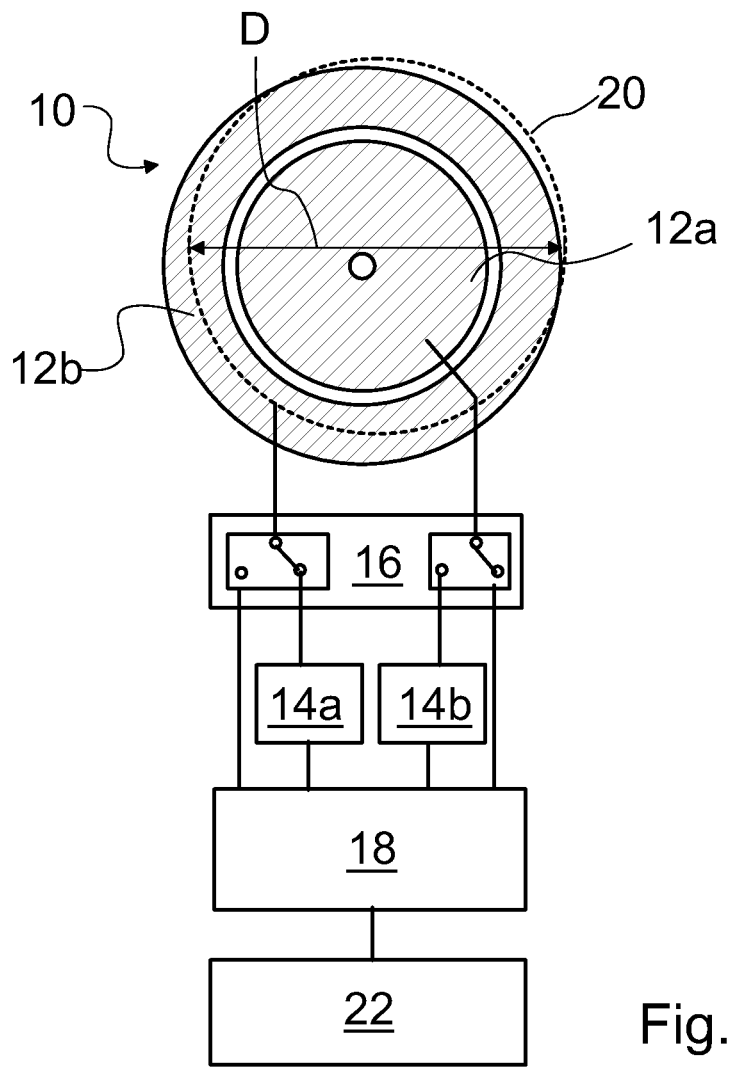
FIG. 1 shows a heating zone of a cooktop with two power supply units, a switching unit and a control unit.

FIG. 1 shows a schematic diagram of a cooktop having a heating zone 10, which is made up of two concentric heating elements 12a and 12b. A cooking utensil element 20 is placed on a cover plate (not shown) of the cooktop made of glass or glass ceramic. A control unit 18 of the cooktop detects a diameter D or the cooking utensil element 20, for example a pot or pan, and connects the radially outer heating element 12b of the heating zone, if the diameter D of the cooking utensil element 20 exceeds a predefined threshold value. In alternative embodiments of the invention the operate can connect the radially outer heating element 12b manually as required by way of a user interface 22.

The cooktop shown in FIG. 1 is configured as an induction cooktop and the heating elements 12a, 12b are inductors, which are supplied by power supply units 14a, 14b configured as inverters. Power circuits respectively comprising one of the heating elements 12a, 12b and one of the inverters 14a, 14b can be opened or closed by way of a switching unit 16. The switching unit 16 may comprise electromechanical relays or high-power semiconductor switching elements such as MOSFETs. The control unit 18 actuates both the inverters 14a, 14b and the switching unit 16 by way of appropriate signal lines, which are connected to corresponding interfaces of the control unit 18.

During operation of the cooktop the user can select a power level for operating the cooktop from a total of 18 possible power levels by way of the user interface 22. The control unit 18 times opening and closing operations of the switching unit 16 as a function of the selected power level and determines a frequency for the heating currents generated by the inverters 14a, 14b.

At lower power levels the control unit 18 operates the heating elements 14a, 14b in a timed operation. The length of these timed periods is referred to here and in the following as heating period T and can be between 0.5 and 20 seconds for induction cooktops and between 30 seconds and 2 minutes for radiant cooktops in different embodiments of the invention.

Figure 2:
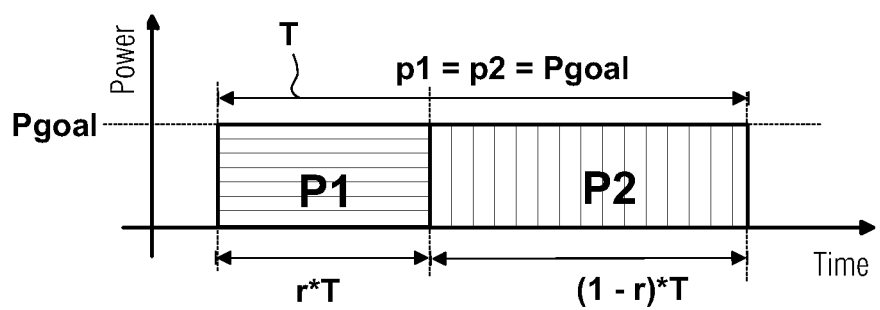
FIG. 2 shows a schematic diagram of the activation of different heating elements of the heating zone from FIG. 1 in a heating period.

FIG. 2 shows a schematic diagram of different phases P1, P2 of a heating period T, in which the two heating elements 12a, 12b are operated. The phases P1, P2 are overlap-free and follow one another directly. The length of the phases P1, P2 corresponds in total to the length of the heating period T. The heating power generated by the two heating elements 12a, 12b during the different phases P1, P2 corresponds to the setpoint heating power Pgoal determined as a function of the power level. A ratio r of the lengths of the two phases P1, P2 determines the ratio of the heating powers p1, p2 generated by the individual concentric heating elements 12a, 12b during the heating period T. The ratio r is determined by the control unit 18 as a function of the diameter D of the cooking utensil element 20 which is automatically detected. To detect the diameter D the control unit 18 evaluates an inductance of the inner inductor 12a and the outer inductor 12b as determined by the cooking utensil element 20 and the power factors of the inner inductor 12a and the outer inductor 12b.

The power factor describes the ratio of the real part of the impedance Z, in other words the resistance R, to the amount of the impedance Z and therefore corresponds to the cosine of the loss angle. The greater the power factor, the stronger the coupling between the inductors 12a, 12b and the base of the cooking utensil element 20. From a high power factor value it is therefore possible to conclude a locally high heating power in the region in which the base of the cooking utensil element 20 overlaps with the corresponding heating element 12a, 12b.

Since the setpoint heating power Pgoal in the operating mode according to FIG. 2 corresponds to the heating power of a single inductor 12a, 12b in continuous operation, the possibility of applying the operating mode illustrated in FIG. 2 is limited to a range of heating powers between the minimum heating power of an inductor during continuous operation and the maximum heating power of said inductor during continuous operation.

Figure 3:
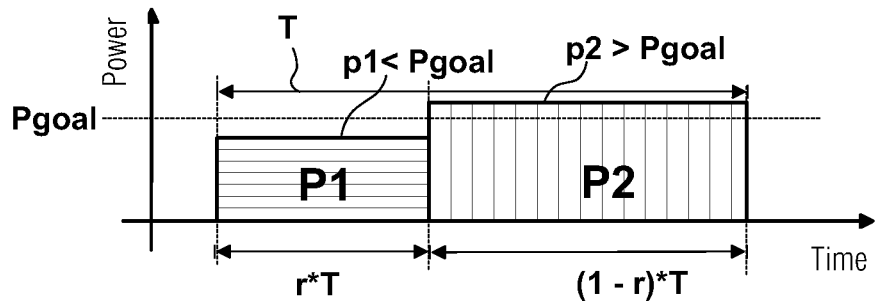
FIG. 3 shows a schematic diagram of the activation of the two heating elements of the heating zone from FIG. 1 during a heating period in an alternative operating mode.

FIG. 3 shows a schematic diagram of a further operating mode, in which the inductors 12a, 12b generate different heating powers p1, p2 due to their structural configuration or due to the fact that they couple to the cooking utensil element 20 to differing degrees. FIG. 3 illustrates the instance where p1 is smaller than the setpoint heating power Pgoal and p2 is greater than the setpoint heating power Pgoal. The duration of the phase P1, in which the inner heating element 12a is operated, is r'×T and the duration of the phase P2, in which the radially outer heating element 12b is operated, is (1−r'×T).

The parameter r' is determined by the equation $$r' = 1 - \frac{Pgoal \cdot (1-r)}{P2},$$

where the parameter r is determined as a function of a degree of overlap between the pot base and the heating element 12a, 12b as in the operating mode illustrated in FIG. 2 in such a manner that a homogeneous surface heating power is achieved over the pot base.

Figure 4:
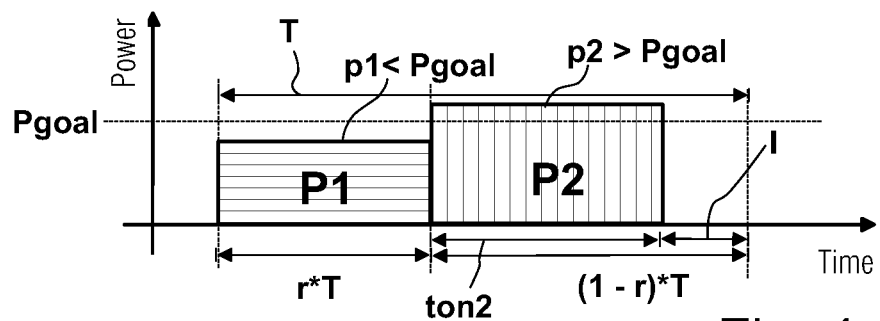
FIG. 4 shows a schematic diagram of the activation of the heating elements in different phases of a heating period, with none of the heating elements being activated in a further phase.

FIG. 4 shows a further operating mode in which the duration of a first phase P1 is determined by r×t, when the setpoint heating power Pgoal corresponds to the heating power p1 of the first heating element 12a. The heating power p2 of the second inductor 12b is greater than the setpoint heating power. The duration ton2 of the second phase P2 is reduced compared with the duration ton1=(1−r)×T of the first phase P1 according to the operating mode in FIG. 2 by the ratio between the setpoint heating power Pgoal and the heating power p2 of the second inductor 12b. This produces the equation ton2=(1−r)×T×Pgoal/P2.

An interval I of length (1−r)×T−ton 2 is characterized in that none of the heating elements 12a, 12b is operated. The operating mode illustrated in FIG. 4 can in particular be used when the second inductor 12b with heating power p2 has already attained a minimum heating power, so that with a predefined ratio r between the heating powers generated in total by the two heating elements 12a, 12b a further variation in the heating power can be achieved by varying the length of the interval I and the heating power p1.

Figure 6:
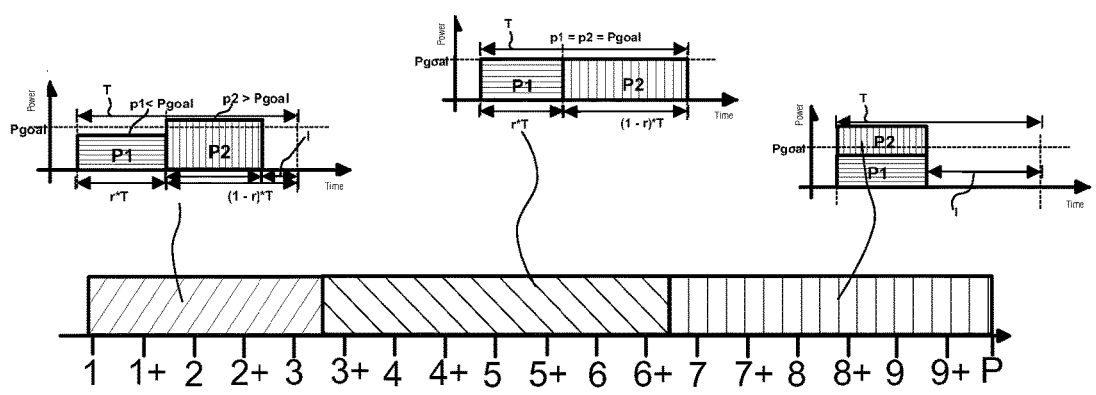
FIG. 6 shows a schematic diagram of the selection of different operating modes as a function of a set power level.

FIG. 6 shows a schematic diagram of an assignment between different power levels between 1 and a booster power level P and different operating modes. In a first operating mode both inductors 12a, 12b or in the exemplary embodiments shown in FIG. 6 both groups of inductors 12a, 12b are operated at their minimum power in different phases P1, P2. With a constant ratio r or r' between the lengths of the phases P1, P2 the heating power averaged over the heating period T is achieved by changing the duration of the phases P1, P2 with the same ratio. The length of the interval I is therefore adjusted so that it makes the total of the two phases up to the duration of the heating period T. The operating mode used in the region of low power levels corresponds essentially to the operating mode illustrated in FIG. 4. In a second range of power levels the control unit 18 uses a second operating mode, in which the frequency of the heating current of one of the inductors 12a, 12b is varied, while the other inductor continues to be operated at minimum frequency or minimum heating power. The duration of the phases is determined here according to the system illustrated in FIG. 3 so that the distribution of the heating power over the two inductors 12a, 12b corresponds to the predefined ratio r.

When the heating power or variable heating frequency reaches a threshold value, the control unit 18 switches to a third operating mode, in which the heating elements 12a, 12b of the heating zone 10 are operated simultaneously at the same frequency. The duration of the phases P1, P2 is determined according to the system illustrated in FIG. 2 or 3 so that a homogeneous heating power is achieved over the pot base of the cooking utensil element 20.

Figure 5:
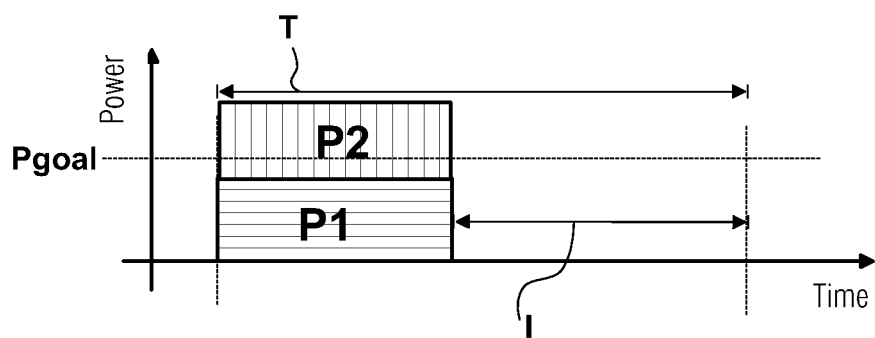
FIG. 5 shows a schematic diagram of the activation of the two heating elements of the heating zone from FIG. 1 in an operating mode in which both heating elements are activated simultaneously.

When the maximum frequency of the inverters 14a, 14b is reached, the control unit 18 finally switches to a fourth operating mode, which corresponds to the one illustrated in FIG. 5 and in which the two heating elements 12a, 12b are operated simultaneously.

The inventive method for operating a cooktop allows the flexible setting of a ratio of the heating powers generated by different inductors, so that an advantageous temperature distribution can be achieved in the cooking utensil element 20. Since in the operating modes with low heating power in particular the inverters 14a, 14b and inductors 12a, 12b are not operated simultaneously, they can be operated at different frequencies without problems arising with intermodulation hum. Flicker noise in the power supply can be avoided as jumps in the power consumption of the cooktop are reduced to a minimum and a power difference between the different phases P1 and P2 of the heating period T is kept small.

LIST OF REFERENCE CHARACTERS

10 Heating zone
12a Heating element
12b Heating element
14 Power supply unit
16 Switching unit
18 Control unit
20 Cooking utensil element
22 User interface
p2 Heating power
p1 Heating power
I Inductance
PF1 Power factor
PF2 Power factor
L1 Inductance
L2 Inductance
f1 Frequency
f2 Frequency
P1 Phase
P2 Phase
T Heating period

The invention claimed is:

1. A cooktop, comprising:
a plurality of heating elements combined to form a heating zone;
a power supply to generate a heating current, the heating current to operate the plurality of heating elements;
a switch to open and close a power circuit, the power circuit having the power supply and one of the plurality of heating elements; and
a controller to determine a characteristic variable of the heating current separately for each heating element; to actuate the switch as a function of a power level selected to operate the heating zone; and to activate, in a first operating state, two of the plurality of heating elements, which are combined to form the heating zone, in different phases of a heating period.

2. The cooktop of claim 1, wherein the plurality of heating elements is a plurality of induction heating elements; wherein the power supply is an inverter; and wherein the characteristic variable of the heating current is a frequency of the heating current.

3. The cooktop of claim 2, wherein the controller determines a respective inductance and a respective power factor of each of the two of the plurality of heating elements and an operating state as a function of the inductances and the power factors of the two of the plurality of heating elements and as a function of the selected power level.

4. The cooktop of claim 1, wherein (1) the different phases follow one another and are separated by a time interval or (2) the different phases follow one another or are separated by a time interval.

5. The cooktop of claim 1, wherein the plurality of heating elements are disposed concentrically.

6. The cooktop of claim 1, wherein the plurality of heating elements are disposed in a two-dimensional grid, and wherein the controller is structured to combine the plurality of heating elements to form flexibly defined heating zones.

7. The cooktop of claim 1, wherein the controller is designed not to activate any of the plurality of heating elements of the heating zone in an additional phase of the heating period.

8. The cooktop of claim 1, wherein, in a second operating state, the controller is structured to operate all of the plurality of heating elements simultaneously.

9. A cooktop, comprising:
a plurality of heating elements combined to form a heating zone;
a power supply to generate a heating current, the heating current to operate the plurality of heating elements;
a switch to open and close a power circuit, the power circuit having the power supply and one of the plurality of heating elements; and
a controller to determine a characteristic variable of the heating current; to actuate the switch as a function of a power level selected to operate the heating zone; and to activate, in a first operating state, two of the plurality of heating elements, which are combined to form the heating zone, in different phases of a heating period, wherein the controller is structured to determine a size of a cooking utensil with a base surface placed on the heating zone and to define a respective length of the different phases as a function of the size in order to achieve homogeneous heating power over the base surface of the cooking utensil.

10. The cooktop of claim 9, wherein the controller is structured to define the respective length of the different phases such that respective heating powers produced by the plurality of the heating elements in the different phases have a predefined ratio to one another.

11. The cooktop of claim 1, wherein the two of the plurality of heating elements activated in the different phases of the heating period are operated in a range of power levels at a same heating power.

12. The cooktop of claim 1, wherein the two of the plurality of heating elements activated in the different phases of a heating period are operated in a range of power levels at different heating powers.

13. A method for operating a cooktop that has a plurality of heating elements combined to form a heating zone; a power supply to generate a heating current for operating the plurality of heating elements; and a switch to open and close a power circuit having the power supply and one of the heating elements, the method comprising:
   determining a characteristic variable of the heating current as a function of a power level selected to operate the heating zone separately for each heating element; and
   activating, in at least one operating state, two of the plurality of heating elements, which are combined to form the heating zone, in different phases of a heating period.

14. The method of claim 13, wherein the plurality of heating elements is a plurality of induction heating elements; wherein the power supply is an inverter; and wherein the characteristic variable of the heating current is a frequency of the heating current.

15. The method of claim 13, wherein a respective inductance and a respective power factor of each of the two of the plurality of heating elements are determined, and wherein an operating state is determined as a function of the inductances and the power factors of the two of the plurality of heating elements and as a function of the power level selected.

16. A cooktop according to claim 1, wherein the characteristic variable is frequency.

17. A cooktop according to claim 1, wherein the controller is configured to independently determine an average heating power of each heating element over the heating period.

18. A cooktop according to claim 17, wherein the controller is configured to average the heating power by (1) adjusting the characteristic variable of the heating element and adjusting lengths of the different heating phases, or (2) adjusting the characteristic variable of the heating element, or (3) adjusting lengths of the different heating phases.

19. A cooktop, comprising:
   a plurality of heating elements combined to form a heating zone;
   a power supply to generate a heating current, the heating current to operate the plurality of heating elements;
   a switch to open and close a power circuit; and
   a controller to determine a characteristic variable of the heating current separately for each heating element; to actuate the switch as a function of a power level selected to operate the heating zone; and to activate, in a first operating state, two of the plurality of heating elements, which are combined to form the heating zone, in different phases of a heating period;
   wherein the controller is configured to independently determine an average heating power of each heating element over the heating period.

20. A cooktop according to claim 19, wherein the characteristic variable is frequency.

21. A cooktop according to claim 19, wherein the controller is configured to average the heating power (1) by adjusting the characteristic variable of the heating element and by adjusting lengths of the different heating phases, or (2) by adjusting the characteristic variable of the heating element, or (3) by adjusting lengths of the different heating phases.

22. The cooktop of claim 19, wherein the plurality of heating elements is a plurality of induction heating elements; wherein the power supply is an inverter; and wherein the characteristic variable of the heating current is a frequency of the heating current.

23. The cooktop of claim 19, wherein the controller determines a respective inductance and a respective power factor of each of the two of the plurality of heating elements and an operating state as a function of the inductances and the power factors of the two of the plurality of heating elements and as a function of the selected power level.

* * * * *